United States Patent
Hasegawa et al.

(10) Patent No.: US 8,761,279 B2
(45) Date of Patent: Jun. 24, 2014

(54) RECEPTION APPARATUS AND METHOD, DEMODULATION APPARATUS AND METHOD, AND PROGRAM

(75) Inventors: Ryo Hasegawa, Tokyo (JP); Katsumi Takaoka, Chiba (JP)

(73) Assignee: Sony Corporation, Tokyo (JP)

( * ) Notice: Subject to any disclaimer, the term of this patent is extended or adjusted under 35 U.S.C. 154(b) by 343 days.

(21) Appl. No.: 13/235,806

(22) Filed: Sep. 19, 2011

(65) Prior Publication Data

US 2012/0099676 A1 Apr. 26, 2012

(30) Foreign Application Priority Data

Oct. 25, 2010 (JP) ................................. 2010-238197

(51) Int. Cl.
*H04L 27/28* (2006.01)
*H04L 27/06* (2006.01)

(52) U.S. Cl.
USPC .......................................... 375/260; 375/340

(58) Field of Classification Search
USPC ........................................ 375/260, 316, 340
See application file for complete search history.

(56) References Cited

U.S. PATENT DOCUMENTS

| | | | | |
|---|---|---|---|---|
| 8,339,930 | B2 * | 12/2012 | Gore et al. ................... | 370/203 |
| 2007/0097920 | A1 * | 5/2007 | Chen et al. ................... | 370/331 |
| 2007/0136779 | A1 * | 6/2007 | Tsushima ..................... | 725/131 |
| 2008/0025424 | A1 * | 1/2008 | Yang et al. ................... | 375/260 |
| 2009/0060101 | A1 | 3/2009 | Liu | |

FOREIGN PATENT DOCUMENTS

JP 2009-65673 3/2009

OTHER PUBLICATIONS

U.S. Appl. No. 13/235,854, filed Sep. 19, 2011, Maruyama, et al.
U.S. Appl. No. 13/235,885, filed Sep. 19, 2011, Hasefawa, et al.
U.S. Appl. No. 13/370,837, filed Feb. 10, 2012, Hasegawa, et al.

* cited by examiner

*Primary Examiner* — Don N Vo
(74) *Attorney, Agent, or Firm* — Oblon, Spivak, McClelland, Maier & Neustadt, L.L.P.

(57) ABSTRACT

A reception apparatus includes: a reception section configured to receive a signal modulated by one of a single-carrier scheme and a multi-carrier scheme that are specified by a predetermined standard; a single-carrier demodulation section configured to execute single-carrier demodulation based on the single-carrier scheme onto the signal; a multi-carrier demodulation section configured to execute multi-carrier demodulation based on the multi-carrier scheme onto the signal; and a demodulation control section configured to control such that one of the single-carrier demodulation and the multi-carrier demodulation is tried on the received signal in accordance with a preset predetermined rule.

18 Claims, 7 Drawing Sheets

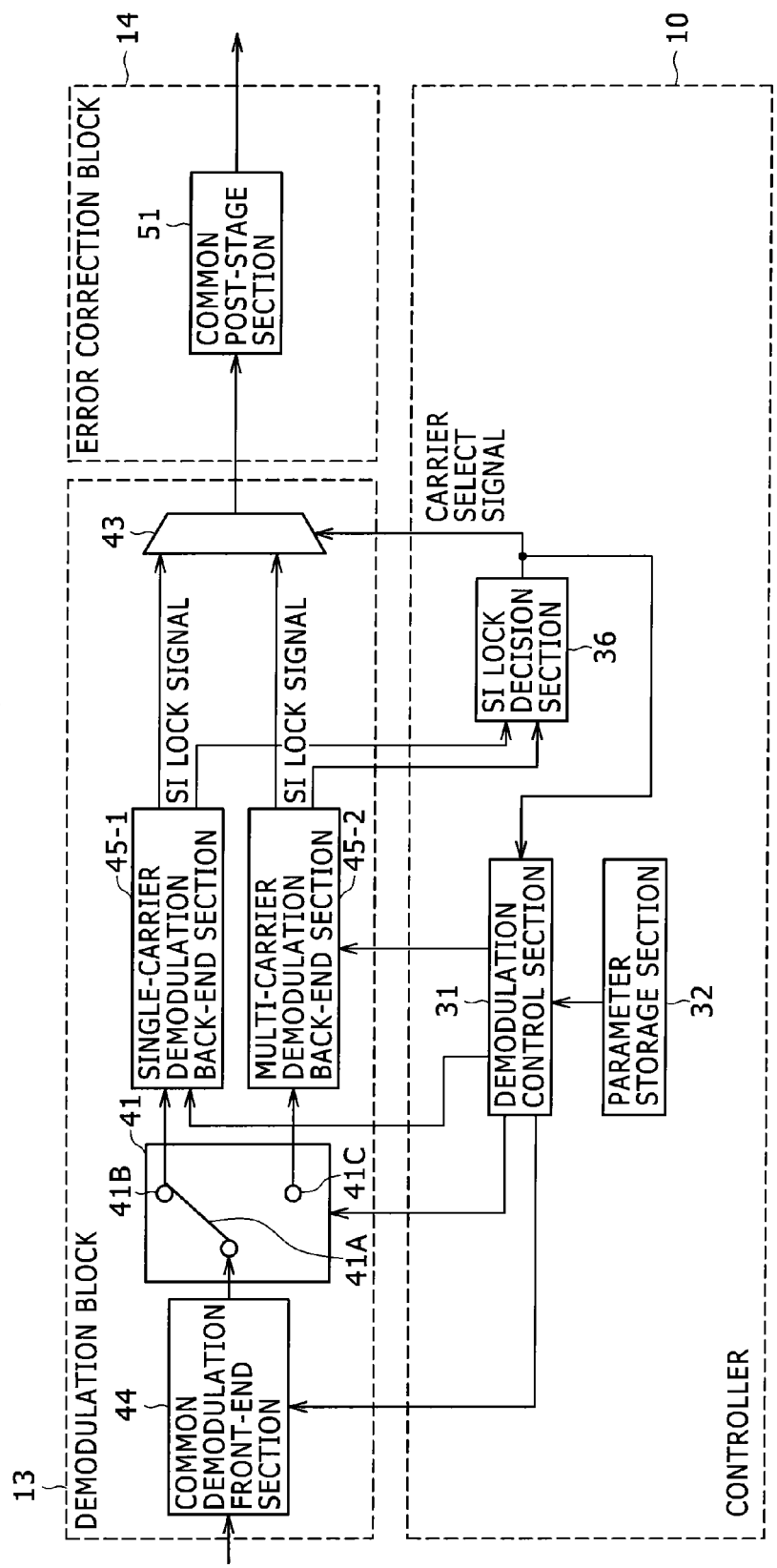

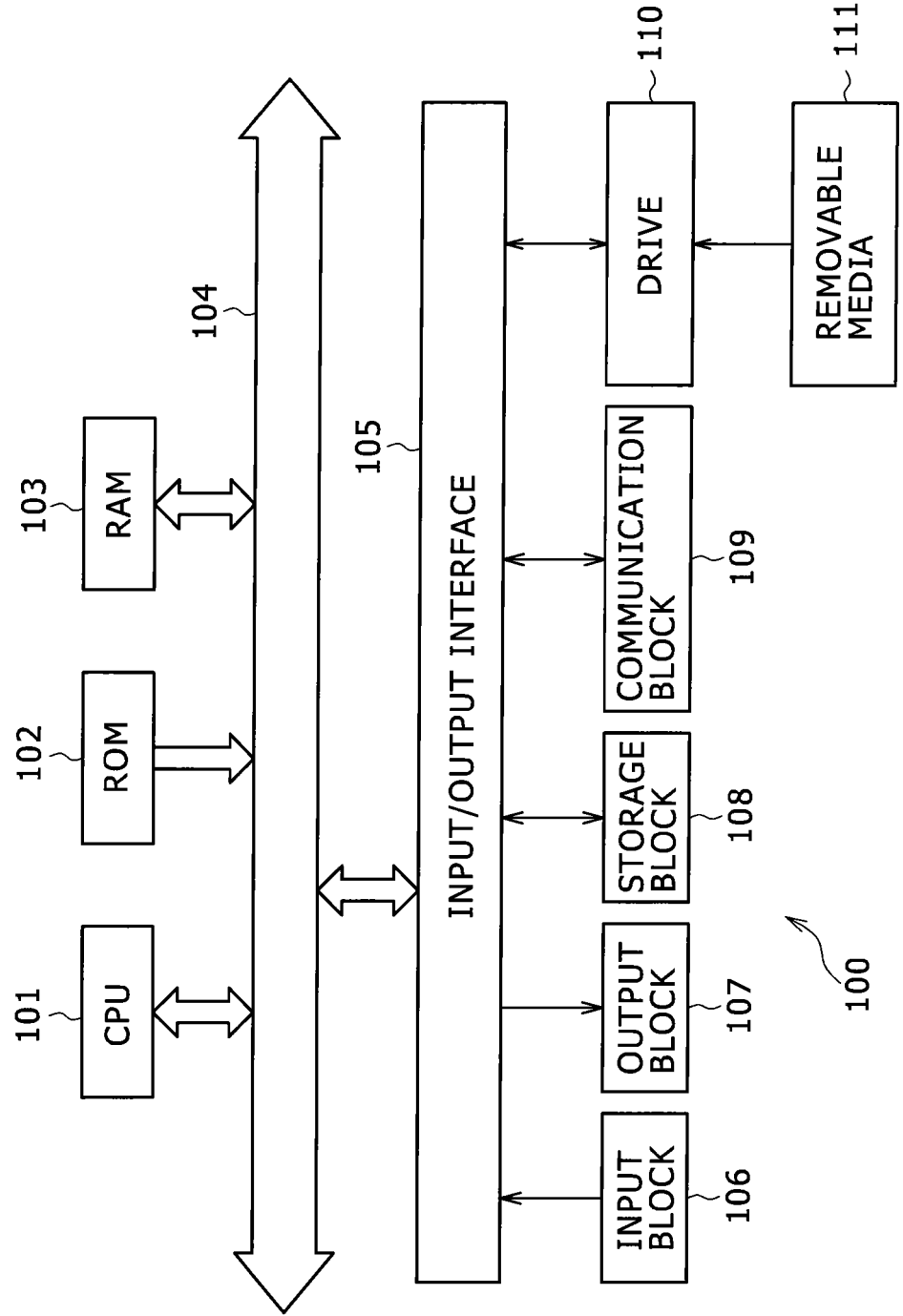

RECEPTION APPARATUS AND METHOD, DEMODULATION APPARATUS AND METHOD, AND PROGRAM

BACKGROUND

The present disclosure relates to a reception apparatus and method, a demodulation apparatus and method, and a program and, more particularly, to a reception apparatus and method, a demodulation apparatus and method, and a program that are configured to surely detect carrier schemes.

The terrestrial digital broadcasting standards include DTMB (Digital Terrestrial Multimedia Broadcast) and so on (refer to Japanese Patent Laid-open No. 2009-65673).

The DTMB standards allows the selection, as a modulating scheme of data, between a modulating scheme based on single carrier (C1) and a modulating scheme based on multiple carriers (C3780). Therefore, every reception apparatus compliant with the DTMB standard has a function of demodulating data transmitted by the modulating scheme based on single carrier and a function of demodulating data transmitted by the modulating scheme based on multi-carriers.

SUMMARY

With the DTMB standard, a signal for the discrimination between single-carrier transmission and multi-carrier transmission is included in system information (SI) of a body block forming a frame of the DTMB standard. This signal is represented by a bit sequence as short as 4 bits, so that, in an environment where the reception of a multi-path signal is difficult, there is a possibility that the bit sequence of the received signal is erroneously detected.

For this reason, methods have been demanded that avoid the above-mentioned erroneous detection to surely detect carrier schemes.

Therefore, the present disclosure addresses the above-identified and other problems associated with related-art methods and apparatuses and solves the addressed problems by providing a reception apparatus and method, a demodulation apparatus and method, and a program that are configured to surely detect the carrier scheme of a signal modulated by one of the single-carrier scheme and the multi-carrier scheme before being transmitted.

In carrying out the present disclosure and according to a first mode thereof, there is provided a reception apparatus. This reception apparatus has a reception section configured to receive a signal modulated by one of a single-carrier scheme and a multi-carrier scheme that are specified by a predetermined standard; a single-carrier demodulation section configured to execute single-carrier demodulation based on the single-carrier scheme onto the signal; a multi-carrier demodulation section configured to execute multi-carrier demodulation based on the multi-carrier scheme onto the signal; and a demodulation control section configured to control such that one of the single-carrier demodulation and the multi-carrier demodulation is tried on the signal in accordance with a preset predetermined rule.

In the above-mentioned reception apparatus, the demodulation control section first tries one of the single-carrier demodulation and the multi-carrier demodulation in accordance with a preset carrier scheme for first trying demodulation.

In the above-mentioned reception apparatus, the demodulation control section controls such that, in accordance with a preset number of trials in each carrier scheme, one of the single-carrier demodulation and the multi-carrier demodulation is repetitively tried by the preset number of trials for each carrier scheme.

In the above-mentioned reception apparatus, if the number of trials of the single-carrier demodulation and the multi-carrier demodulation exceeds a preset predetermined number of times, then the demodulation control section stops the trial of demodulation.

In the above-mentioned reception apparatus, the demodulation control section controls such that one of the single-carrier demodulation and the multi-carrier demodulation is tried in accordance with a ratio of a number of trials of each carrier scheme to a preset total number of trials.

In the above-mentioned reception apparatus, if the number of trials of the single-carrier demodulation and the multi-carrier demodulation exceeds a preset maximum number of trials, then the demodulation control section stops the trial of demodulation.

In the above-mentioned reception apparatus, if a trial of any one of the single-carrier demodulation and the multi-carrier demodulation is successful, the demodulation control section controls such that an output of any one of the single-carrier demodulation section and the multi-carrier demodulation section, whichever is successful in the trial of demodulation, is outputted to a post stage.

In the above-mentioned reception apparatus, the single-carrier demodulation section and the multi-carrier demodulation section include a common demodulation front-end section configured to execute demodulation processing common to the single-carrier demodulation section and the multi-carrier demodulation section; a single-carrier demodulation back-end section configured to execute demodulation processing unique to the single-carrier demodulation section; and a multi-carrier demodulation back-end section configured to execute demodulation processing unique to the multi-carrier demodulation section.

In carrying out the present disclosure and according to the first mode thereof, there is provided a reception method. This reception method including: receiving a signal modulated by one of a single-carrier scheme and a multi-carrier scheme that are specified by a predetermined standard, by a reception apparatus; executing single-carrier demodulation based on the single-carrier scheme onto the signal by the reception apparatus; executing multi-carrier demodulation based on the multi-carrier scheme onto the signal by the reception apparatus; and, controlling such that one of the single-carrier demodulation and the multi-carrier demodulation is tried on the signal in accordance with a preset predetermined rule, by the reception apparatus.

In carrying out the present disclosure and according to the first mode thereof, there is provided a computer program. This computer program causes a computer to function as: a reception section configured to receive a signal modulated by one of a single-carrier scheme and a multi-carrier scheme that are specified by a predetermined standard; a single-carrier demodulation section configured to execute single-carrier demodulation based on the single-carrier scheme onto the signal; a multi-carrier demodulation section configured to execute multi-carrier demodulation based on the multi-carrier scheme onto the signal; and a demodulation control section configured to control such that one of the single-carrier demodulation and the multi-carrier demodulation is tried on the received signal in accordance with a preset predetermined rule.

In the reception apparatus and method and a computer program according to the first mode of the present disclosure, a signal modulated by the single-carrier scheme or the multi-carrier scheme each specified by a predetermined standard is received. Single-carrier demodulation based on the single-carrier scheme is executed on the signal. Multi-carrier demodulation based on the multi-carrier scheme is executed on the signal. Then, one of single-carrier demodulation and the multi-carrier demodulation is tried on the signal in accordance with preset predetermined rules.

In carrying out the present disclosure and according to a second mode thereof, there is provided a demodulation apparatus. This demodulation apparatus includes a single-carrier demodulation section configured to execute, on a reception signal modulated by one of a single-carrier scheme specified by a predetermined standard and a multi-carrier scheme specified by a predetermined standard, single-carrier demodulation based on the single-carrier scheme; a multi-carrier demodulation section configured to execute multi-carrier demodulation based on the multi-carrier scheme onto the reception signal; and a demodulation control section configured to control such that any one of the single-carrier demodulation and the multi-carrier demodulation is tried on the reception signal in accordance with a preset predetermined rule.

In the above-mentioned demodulation apparatus, the demodulation control section first tries one of the single-carrier demodulation and the multi-carrier demodulation in accordance with a preset carrier scheme for first trying demodulation.

In the above-mentioned demodulation apparatus, the demodulation control section controls such that, in accordance with a preset number of trials in each carrier scheme, one of the single-carrier demodulation and the multi-carrier demodulation is repetitively tried by the preset number of trials for each carrier scheme.

In the above-mentioned demodulation apparatus, if the number of trials of the single-carrier demodulation and the multi-carrier demodulation exceeds a preset predetermined number of times, then the demodulation control section stops the trial of demodulation.

In the above-mentioned demodulation apparatus, the demodulation control section controls such that one of the single-carrier demodulation and the multi-carrier demodulation is tried in accordance with a ratio of a number of trials of each carrier scheme to a preset total number of trials.

In the above-mentioned demodulation apparatus, if the number of trials of the single-carrier demodulation and the multi-carrier demodulation exceeds a preset maximum number of trials, then the demodulation control section stops the trial of demodulation.

In the above-mentioned demodulation apparatus, if a trial of any one of the single-carrier demodulation and the multi-carrier demodulation is successful, the demodulation control section controls such that an output of any one of the single-carrier demodulation section and the multi-carrier demodulation section, whichever is successful in the trial of demodulation, is outputted to a post stage.

In the above-mentioned demodulation apparatus, the single-carrier demodulation section and the multi-carrier demodulation section include a common demodulation front-end section configured to execute demodulation processing common to the single-carrier demodulation section and the multi-carrier demodulation section; a single-carrier demodulation back-end section configured to demodulation processing unique to the single-carrier demodulation section; and a multi-carrier demodulation back-end section configured to execute demodulation processing unique to the multi-carrier demodulation section.

In carrying out the present disclosure and according to the second mode thereof there is provided a demodulation method. This demodulation method including: executing, on a reception signal modulated by one of a single-carrier scheme specified by a predetermined standard and a multi-carrier scheme specified by a predetermined standard, single-carrier demodulation based on the single-carrier scheme by a demodulation apparatus; executing multi-carrier demodulation based on the multi-carrier scheme onto the reception signal by the demodulation apparatus; and, controlling such that any one of the single-carrier demodulation and the multi-carrier demodulation is tried on the reception signal in accordance with a preset predetermined rule by the de-modulation apparatus.

In carrying out the present disclosure and according to the second mode thereof, there is provided a computer program for causing a computer to function as: a single-carrier demodulation section configured to execute, on a reception signal modulated by one of a single-carrier scheme specified by a predetermined standard and a multi-carrier scheme specified by a predetermined standard, single-carrier demodulation based on the single-carrier scheme; a multi-carrier demodulation section configured to execute multi-carrier demodulation based on the multi-carrier scheme onto the reception signal; and demodulation control section configured to control such that any one of the single-carrier demodulation and the multi-carrier demodulation is tried on the reception signal in accordance with a preset predetermined rule.

In the demodulation apparatus and method and a computer program according to the second mode of the present disclosure, single-carrier demodulation based on the single-carrier scheme is executed on a reception signal modulated by any one of the single-carrier scheme and the multi-carrier scheme specified by a predetermined standard. Multi-carrier demodulation based on the multi-carrier scheme is executed on the reception signal. Any one of single-carrier demodulation and multi-carrier demodulation is tried on the reception signal in accordance with preset predetermined rules.

As described above and according to the embodiments of the present disclosure, carrier schemes can be surely detected.

BRIEF DESCRIPTION OF THE DRAWINGS

FIG. 6 is a block diagram illustrating another exemplary configuration (or a third configuration) of the demodulation processing block; and FIG. 7 is a block diagram illustrating an exemplary hardware configuration of a computer.

DETAILED DESCRIPTION OF THE PREFERRED EMBODIMENTS

The present disclosure will be described in further detail by way of embodiments thereof with reference to the accompanying drawings. The description will be executed in the following order:

1. The first embodiment;
2. The second embodiment;
3. The third embodiment;
4. The fourth embodiment; and
5. Variations 1. >The First Embodiment ≤

[Exemplary Configuration of a Reception Apparatus]

Figure 1:
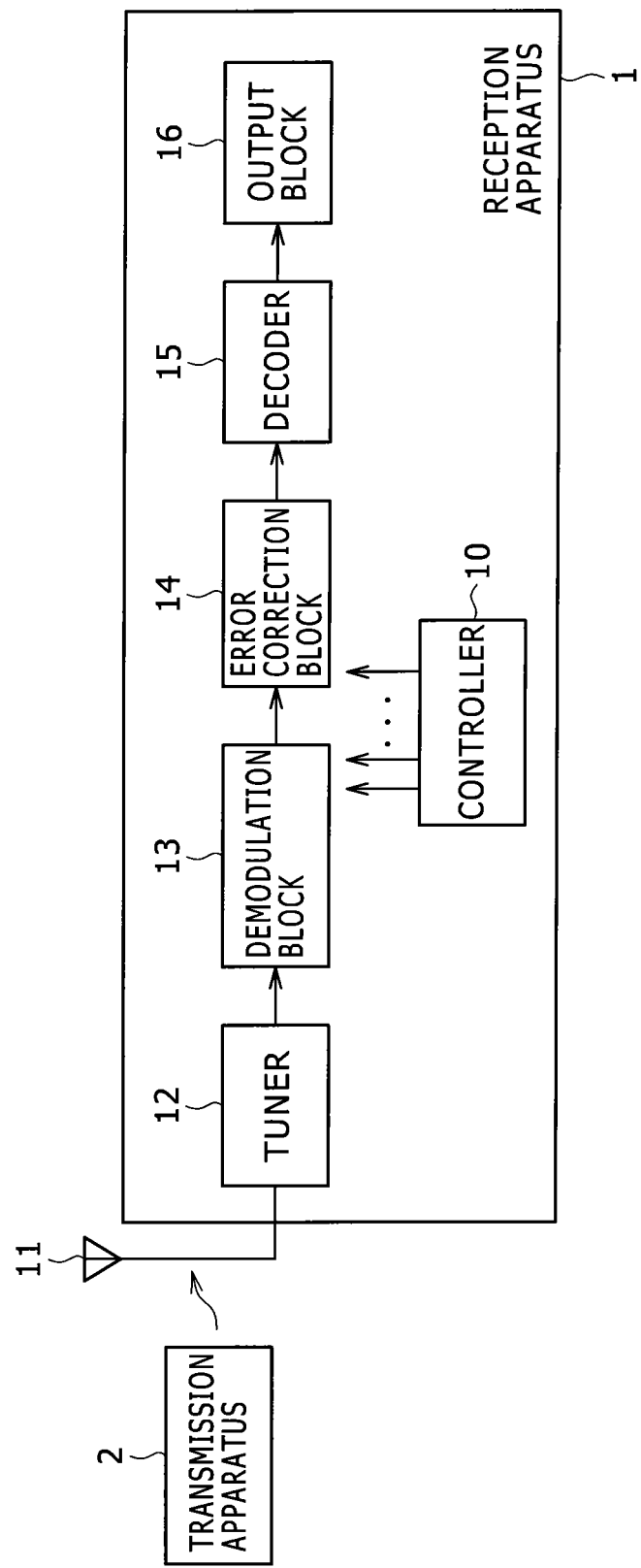
FIG. 1 is a block diagram illustrating an exemplary configuration of a reception apparatus practiced as one embodiment of the present disclosure.

FIG. 1 is a block diagram illustrating an exemplary configuration of a reception apparatus practiced as one embodiment of the present disclosure.

A reception apparatus 1 is an reception apparatus compliant with the DTMB standard that is a terrestrial digital broadcasting, for example. The reception apparatus 1 has an antenna 11, a tuner 12, a demodulation block 13, an error correction block 14, a decoder 15, and an output block 16. The reception apparatus 1 also has a controller 10 configured to control the operations of component blocks of the reception apparatus 1.

The antenna 11 receives an RF signal transmitted from a transmission apparatus 2 of a broadcasting station for example via a transmission path and supplies the received RF signal to the tuner 12.

The tuner 12 frequency-converts the RF signal received by the antenna 11. An IF signal obtained by frequency-converting the RF signal is supplied to the demodulation block 13.

The demodulation block 13 executes A/D conversion on the signal supplied from the tuner 12 and then executes predetermined demodulation processing, such as synchronization processing and equalization processing, on the A/D-converted signal, supplying the data obtained as a result of the demodulation processing to the error correction block 14.

The error correction block 14 executes predetermined error correction processing on the data supplied from the demodulation block 13 and supplies the encoded data obtained as a result of the error correction processing to the decoder 15.

The decoder 15 executes MPEG decoding for example on the encoded data supplied from the error correction block 14 and supplies image data and audio data obtained as a result of the decoding to the output block 16.

The output block 16 is made up of a display apparatus and a loudspeaker, for example. The display apparatus displays an image corresponding to the image data supplied from the decoder 15. The loudspeaker outputs sound corresponding to the audio data supplied from the decoder 15.

The reception apparatus 1 is configured as described above.

[Exemplary Configuration of the Demodulation Processing Block (the First Configuration)]

Figure 2:
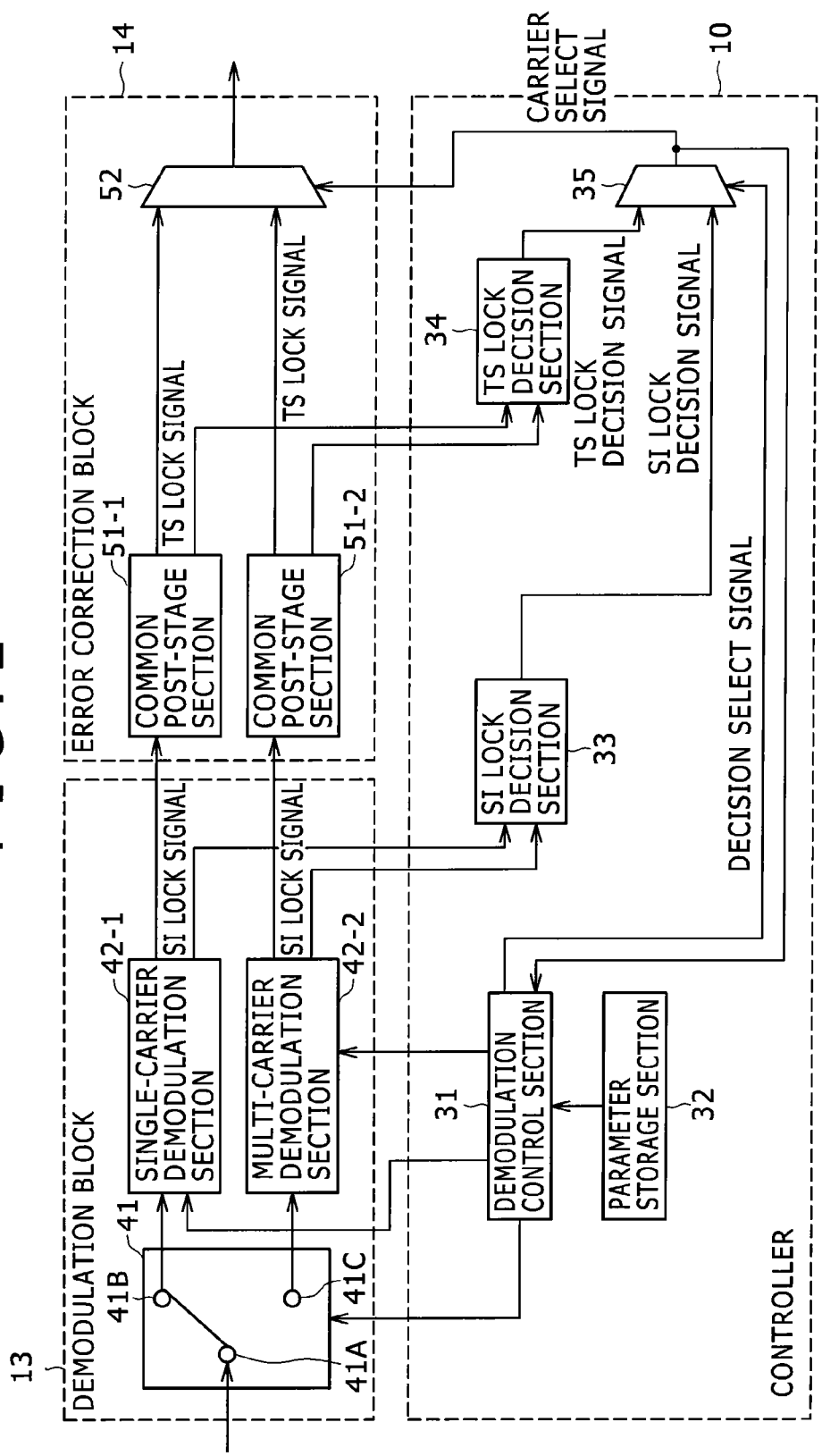
FIG. 2 is a block diagram illustrating an exemplary configuration (or a first configuration) of a demodulation processing block.

The following describes, with reference to FIG. 2, detail exemplary configurations of the controller 10, the demodulation block 13, and the error correction block 14 (hereafter collectively referred to as a demodulation processing block) that are associated with the demodulation processing, of the component blocks making up the reception apparatus 1 shown in FIG. 1.

As shown in FIG. 2, the controller 10 has a demodulation control section 31, a parameter storage section 32, an SI lock decision section 33, a TS lock decision section 34, and a selector 35.

The parameter storage section 32 stores various parameters for making the demodulation control section 31 try any one of single-carrier demodulation based on the single-carrier scheme and multi-carrier demodulation based on the multi-carrier scheme in accordance with predetermined rules. Details of these parameters will be described later. For example, the parameter storage section 32 stores, as parameters, types of carrier schemes for trying modulation for the first time and the number of times single-carrier demodulation and multi-carrier demodulation has been tried, for example.

The demodulation control section 31 acquires parameters stored in the parameter storage section 32. In accordance with predetermine rules specified by the various parameters obtained from the parameter storage section 32, the demodulation control section 31 controls the demodulation block 13 such that the demodulation of any one of the single-carrier demodulation and the multi-carrier demodulation to be executed by the demodulation block 13 is tried.

The demodulation block 13 is made up of a switch block 41, a single-carrier demodulation section 42-1, and a multi-carrier demodulation section 42-2.

The switch block 41 switches the output destination of an input signal supplied from the tuner 12 under the control of the demodulation control section 31. To be more specific, in trying single-carrier demodulation, the switch block 41 connects a switch 41A to a terminal 41B, thereby outputting the input signal from the tuner 12 to the single-carrier demodulation section 42-1. Also, in trying multi-carrier demodulation, the switch block 41 switches the switch 41A to a terminal 41C, thereby outputting the input signal from the tuner 12 to the multi-carrier demodulation section 42-2.

The single-carrier demodulation section 42-1 executes single-carrier demodulation on the input signal supplied from the switch block 41 under the control of the demodulation control section 31 in accordance with the single-carrier scheme and outputs the data obtained as a result of the single-carrier demodulation to the error correction block 14. If the trial of single-carrier demodulation has been successful, the single-carrier demodulation section 42-1 supplies, to the SI lock decision section 33, a signal (hereafter referred to as an SI (System Information) lock signal) indicative that the demodulation has been successful and locking with the single-carrier scheme has been executed.

The multi-carrier demodulation section 42-2 executes multi-carrier demodulation on the input signal supplied from the switch block 41 under the control of the demodulation control section 31 in accordance with the multi-carrier scheme and outputs data obtained as a result of the demodulation to the error correction block 14. Also, if the trial of multi-carrier demodulation has been successful, the multi-carrier demodulation section 42-2 supplies, to the SI lock decision section 33, a signal indicative that the demodulation has been successful and locking with the multi-carrier scheme has been executed.

It should be noted that, if the OFDM scheme is used for the multi-carrier transmission for transmitting data in the multi-carrier scheme, an OFDM signal that is a baseband obtained by orthogonal demodulation executed by a processing block, not shown, is entered as an input signal into the multi-carrier demodulation section 42-2 for the output of the tuner 12.

The SI lock decision section 33 is entered with an SI lock signal from any one of the single-carrier demodulation section 42-1 and the multi-carrier demodulation section 42-2. When an SI clock is entered, the SI lock decision section 33 determines a carrier scheme in accordance with the entered SI lock signal and supplies a signal (hereafter referred to as an SI lock decision signal) indicative of a result of this decision to the selector 35.

The error correction block 14 has a common post-stage section 51-1, a common post-stage section 51-2, and a selector 52.

The common post-stage section 51-1 is supplied with data obtained by single-carrier demodulation from the single-carrier demodulation section 42-1. The common post-stage section 51-1 executes predetermined error correction processing, such as FED (Forward Error Correction) for example, on the demodulated data from the single-carrier demodulation section 42-1 and outputs the encoded data obtained by this error correction processing to the selector 52.

It should be noted that, in the transmission apparatus 2 (FIG. 1), image and audio data as a program are MPEG (Moving Picture Experts Group) encoded and a signal made up of packets including the MPEG-encoded data is transmitted. At the same time, in the transmission apparatus 2, the data is encoded into RS (Read-Solomon) code in order to make the data robust against errors that occur on transmission paths. Therefore, in the common post-stage section 51-1, processing, such as decoding the encoded data, is executed as error correction processing, a TS (Transport Stream) obtained by this decoding being outputted.

If the error correction processing has been successful, then the common post-stage section 51-1 supplies a signal (hereafter referred to as a TS (Transport Stream) lock signal) indicative that the error correction processing has been successful and locking with the single-carrier scheme has been executed to the TS lock decision section 34.

The common post-stage section 51-2 is supplied with data obtained by multi-carrier demodulation from the multi-carrier demodulation section 42-2. The common post-stage section 51-2 executes processing, such as error correction for example, on the demodulated data from the multi-carrier demodulation section 42-2 and outputs the encoded data obtained by this processing to the selector 52. At the same time, if the error correction processing has been successful, the common post-stage section 51-2 supplies a TS lock signal indicative that this processing has been successful and locking with the multi-carrier scheme has been executed to the TS lock decision section 34.

The TS lock decision section 34 is entered with a TS lock signal from any one of the common post-stage section 51-1 and the common post-stage section 51-2. If a TS lock signal is entered, the TS lock decision section 34 determines a carrier scheme in accordance with the entered TS lock signal and supplies a signal (hereafter referred to as a TS lock decision signal) indicative of a result of this decision to the selector 35.

The selector 35 is supplied with the SI lock decision signal from the SI lock decision section 33 and the TS lock decision signal from the TS lock decision section 34. At the same time, the selector 35 is supplied with a signal (hereafter referred to as a decision select signal) from the demodulation control section 31 for preferentially selecting any one of an SI lock decision signal and a TS lock decision signal.

In accordance with a decision select signal from the demodulation control section 31, the selector 35 selects any one of an SI lock decision signal and a TS lock decision signal. The selector 35 supplies a signal (hereafter referred to as a carrier select signal) for the selection of a carrier scheme in accordance with the selected decision signal to the demodulation control section 31 and the selector 52.

In accordance with the carrier select signal supplied from the selector 35, the selector 52 outputs, to the decoder 15 of the post stage, one of the outputs of the common post-stage section 51-1 and the common post-stage section 51-2, namely, the output (the TS output for example) of the locked carrier scheme, or the side successful in demodulation trial.

If demodulation trial has been successful by one carrier scheme, a carrier select signal is supplied from the selector 35 to the demodulation control section 31, so that the demodulation based on the carrier scheme in accordance with the carrier select signal is controlled by the demodulation control section 31. To be more specific, if the carrier select signal is indicative of the single-carrier scheme, the demodulation control section 31 connects the switch 41A to the terminal 41B through the switch block 41, thereby letting the input signal from the tuner 12 be outputted to the single-carrier demodulation section 42-1. Consequently, in the single-carrier demodulation section 42-1, single-carrier demodulation is executed on the single-carrier signal modulated in the single-carrier scheme.

On the other hand, if the carrier select signal from the selector 35 is indicative of the multi-carrier scheme, then the demodulation control section 31 connects the switch 41A to the terminal 41C through the switch block 41, thereby letting the input signal from the tuner 12 be outputted to the multi-carrier demodulation section 42-2. Consequently, in the multi-carrier demodulation section 42-2, multi-carrier demodulation is executed on the multi-carrier signal modulated in the multi-carrier scheme.

The demodulation processing block is configured as described above.

[The First Demodulation Trial Processing]

Figure 3:
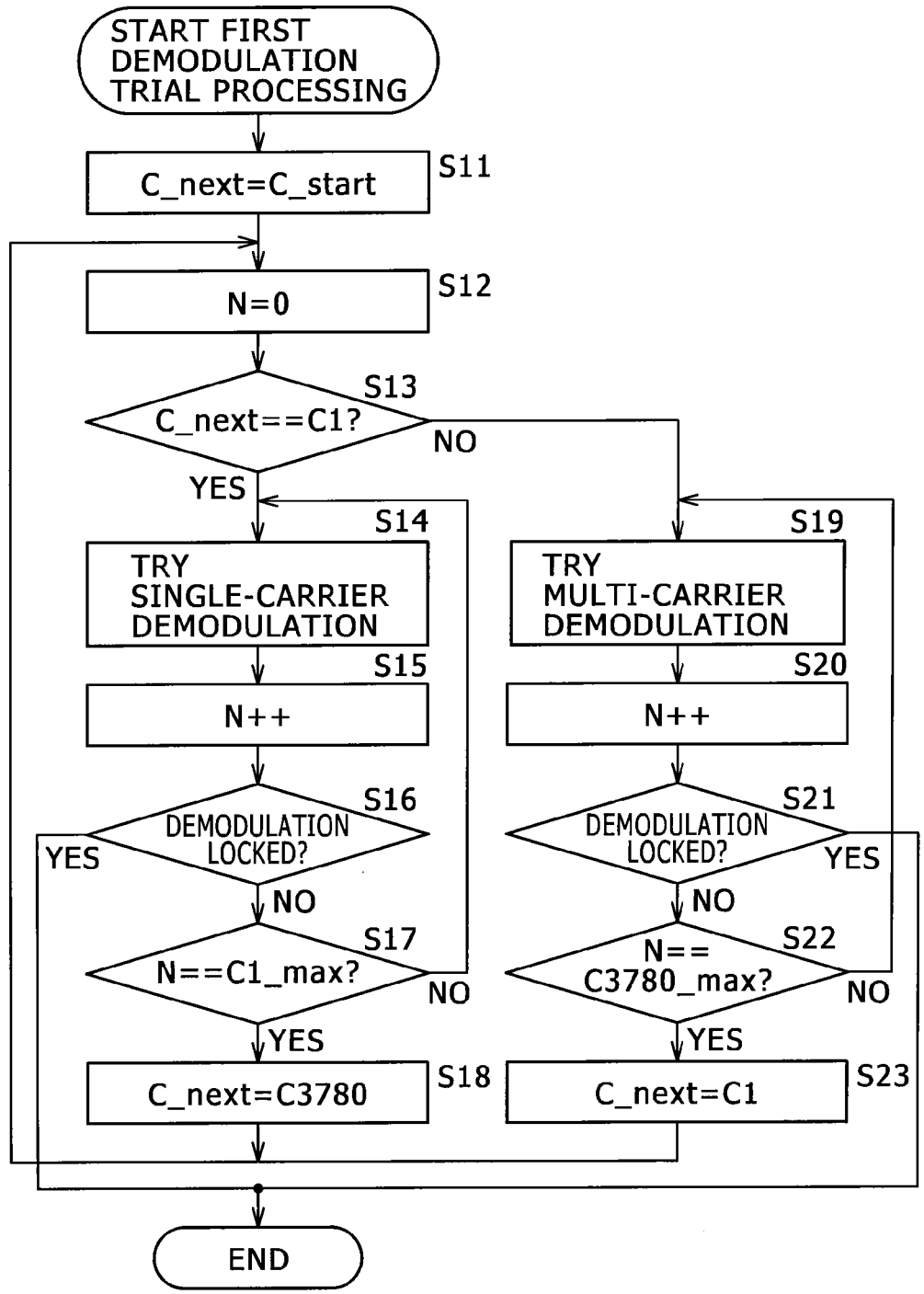
FIG. 3 is a flowchart indicative of a first demodulation trial processing.

The following describes the first demodulation trial processing that is executed by the demodulation block 13 under the control of the controller 10, with reference to the flowchart shown in FIG. 3.

It should be noted that, in the first demodulation trial processing, C_next (the type of a carrier scheme in which demodulation is tried) and N (count) are used as variables. In addition, in the first demodulation trial processing, processing operations using various preset parameters are executed, these parameters including the following three types of parameters that are variable.

C_start=the type of a carrier scheme in which demodulation is first tried;

C1_max=the number of times single-carrier demodulation (hereafter also referred to as C1 demodulation) is tried; and C3780_max=the number of times multi-carrier demodulation (hereafter also referred to as C3780 demodulation) is tried.

In the reception apparatus 1, when each channel is scanned and the first demodulation trial processing shown in FIG. 3 is started, the demodulation control section 31 reads parameters from the parameter storage section 32. Next, the demodulation control section 31 substitutes a preset value of C-start into C_next as parameter initialization (step S11) and initializes counter N to 0 (step S12). Next, in step S13, the demodulation control section 31 determines whether or not the value substituted into C_next as C_start is C1 (single carrier).

If the value substituted into C_next is found to be C1 in step S13, then the procedure goes to step S14, in which single-carrier demodulation is tried by the single-carrier demodulation section 42-1. When single-carrier demodulation is tried, counter N is incremented by the demodulation control section 31 (step S15).

In step S16, the demodulation control section 31 determines on the basis of the carrier select signal from the selector 35 whether or not demodulation lock is on. If demodulation lock is found not on in step S16, then the procedure goes to step S17.

It should be noted that demodulation lock denotes a state in which a carrier scheme has been detected by the above-mentioned trial of single-carrier demodulation or multi-carrier demodulation and the demodulation of any one of single-carrier demodulation and multi-carrier demodulation is locked. To be more specific, this demodulation lock is determined by an SI lock signal or a TS lock signal and, when demodulation lock is turned on, it indicates that the carrier scheme of a transmitted signal has been detected, upon which the demodulation trial processing shown in FIG. 3 is terminated.

In step S17, the demodulation control section 31 determines whether or not counter N has reached C1_max. If counter N is found to have not reached C1_max in step S17, then the procedure returns to step S14 to repeat the processing operations of step S14 through step S17 until demodulation lock is found turned on ("Yes" in step S16) or counter N is found to have reached C1_max ("Yes" in step S17).

If single-carrier demodulation has been tried while incrementing count N by repeating the processing operations of step S14 through step S17 and demodulation lock is found turned on in step S16, then it indicates that the demodulation is successful as a result of the trial of single-carrier demodulation. Namely, in this case, the single-carrier scheme has been detected as the carrier scheme of the transmitted signal, so that the first demodulation trial processing shown in FIG. 3 is terminated.

On the other hand, if counter N is found to have reached C1_max in step S17, then procedure goes to step S18. In step S18, when C3780 (multi-carrier) is substituted into C_next by the demodulation control section 31, then the procedure returns to step S12 to initialize counter N to 0 (step S12).

Next, in step S13, the demodulation control section 31 determines whether or not the value substituted into C_next is C1. Because C3780 is substituted into C_next this time ("No" in step S13), the procedure goes to step S19, in which multi-carrier demodulation is tried by the multi-carrier demodulation section 42-2. When multi-carrier demodulation has been tried, counter N is incremented by the demodulation control section 31 (step S20).

In step S21, the demodulation control section 31 determines whether or not demodulation lock is turned on or not. If demodulation lock is found not turned on in step S21, then the procedure goes to step S22.

In step S22, the demodulation control section 31 determines whether or not counter N has reached C3780_max. If counter N is found not to have reached C3780_max in step S22, then the procedure returns to step S19 to repeat the processing operations of step S19 through step S22 until demodulation lock is found turned on ("Yes" in step S21) or counter N is found to have reached C3780_max ("Yes" in step S22).

If multi-carrier demodulation has been tried while incrementing count N by repeating the processing operations of step S19 through step S22 and demodulation lock is found turned on in step S21, then it indicates that the demodulation is successful as a result of the trial of multi-carrier demodulation. Namely, in this case, the multi-carrier scheme has been detected as the carrier scheme of the transmitted signal, so that the first demodulation trial processing shown in FIG. 3 is terminated.

On the other hand, if counter N is found to have reached C3780_max in step S22, then procedure goes to step S23. In step S23, when C1 is substituted into C_next by the demodulation control section 31, then the procedure returns to step S12 to initialize counter N to 0 (step S12).

Then, the demodulation control section 31 determines again whether or not the value substituted into C_next is C1 in step S13. Because C1 is substituted into C_next this time ("Yes" in step S13), the procedure goes to step S14, in which single-carrier demodulation is tried. If the execution of single-carrier demodulation could not turn on demodulation lock until counter N has reached C1_max, thereby failing demodulation, then C3780 is substituted into C_next again, thereby trying multi-carrier demodulation.

As described above, the trial of single-carrier demodulation and multi-carrier demodulation alternately and repetitively tries single-carrier demodulation and multi-carrier demodulation by the number of times of trial of each demodulation until demodulation lock is turned on. When demodulation clock is eventually turned on, the first demodulation trial processing shown in FIG. 3 is terminated.

That the parameters of C_start, C1_max, and C3780_max can be set to desired values was described as above. The following describes specific examples of these parameters.

(a) Setting of Parameter C_start

C_start is a parameter for setting from which of the single-carrier method and the multi-carrier method the demodulation trial is to be started. Therefore, if C1 is set with C_start, then single-carrier demodulation is tried first; if C3780 is set with C_start, then multi-carrier demodulation is started first.

(a-1) If C_start=C1 is set:

In this case, like C1 demodulation→C3780 demodulation→C1 demodulation→C3780 demodulation→C1 demodulation→C3780 demodulation and so on, the demodulation trial processing starting from C1 demodulation is tried repetitively in the order of C3780 demodulation and C1 demodulation.

(a-2) If C_start=C3780 is set:

In this case, like C3780 demodulation→C1 demodulation→C3780 demodulation→C1 demodulation→C3780 demodulation→C1 demodulation and so on, the demodulation trial processing starting from C3780 demodulation is tried repetitively in the order of C3780 demodulation and C1 demodulation.

(b) Setting of Parameters C1_max and C3780_max

C1_max is a parameter for setting the number of times C1 demodulation is tried. C3780_max is a parameter for setting the number of times C3780 demodulation is tried.

(b-1) If C1_max=3, C3780_max=2, C_start=C1 are set:

In this case, like C1 demodulation→C1 demodulation→C1 demodulation→C3780 demodulation→C3780 demodulation→C1 demodulation and so on, the demodulation trial processing starting from C1 demodulation is repeated in units of three operations of C1 demodulation and two operations of C3780 demodulation.

(c) Others

Ratios of the number of times C1 demodulation and C3780 demodulation are tried to the total number of trials may be set as a parameter other than those defined above. For example, if the ratio of C1 demodulation is 60% and the ratio of C3780 demodulation is 40%, then trials are executed like C1 demodulation→C1 demodulation→C3780 demodulation→C1 demodulation→C3780 demodulation→C1 demodulation→C1 demodulation→C3780 demodulation→C1 demodulation→C3780 demodulation and so on. That is, in this case, C1 demodulation is tried six times and C3780 demodulation is tried four times of the total 10 times of trials.

As described above, in the first embodiment of the present disclosure, single-carrier demodulation or a multi-carrier demodulation is tried on a transmitted signal in accordance with predetermined rules, thereby detecting the carrier scheme of this signal. To be more specific, in the first embodiment, carrier scheme detection is executed not by detecting the carrier scheme from a bit train included in the system information but by trying single-carrier demodulation and multi-carrier demodulation in accordance with predetermined rules. Consequently, even in environments where multi-path reception is difficult, the repetition of modulation trials in accordance with predetermined rules allows the sure detection of carrier schemes.

In addition, because parameters such as C_start, C1_max, C3780_max, and ratios of C1 demodulation and C3780 demodulation trials to the total number of trials can be set, not only the sure detection of carrier schemes but also the more flexible detection of carrier schemes can be executed. For example, the carrier-scheme trial sequence and the number of carrier scheme trials classified by region are registered in advance in each television receiver (or a reception apparatus). This television receiver allows the viewer to execute channel scan operations by the registered carrier scheme trial sequence and the number of trials dedicated to the region of the viewer in the channel scan to be executed after the selection of the region of the viewer after the purchase of this television receiver. For example, even in a wide region in China employing the DTMB standard as the standard of terrestrial digital broadcasting where different regions have different carrier schemes, the proper carrier scheme trial sequence and the number of trials can be set in advance for each of these regions. Consequently, the carrier scheme detection time can be shortened in all regions.

2. >The Second Embodiment ≤

It should be noted here that, if executing the trials of single-carrier demodulation and multi-carrier demodulation by a certain number of times, demodulation may fail, indicating that there is no signal in the frequency band on which demodulation is current tried.

The following describes demodulation trial processing to be executed if there is no signal in the frequency band on which demodulation is currently tried.

[The Second Demodulation Trial Processing]

Figure 4:
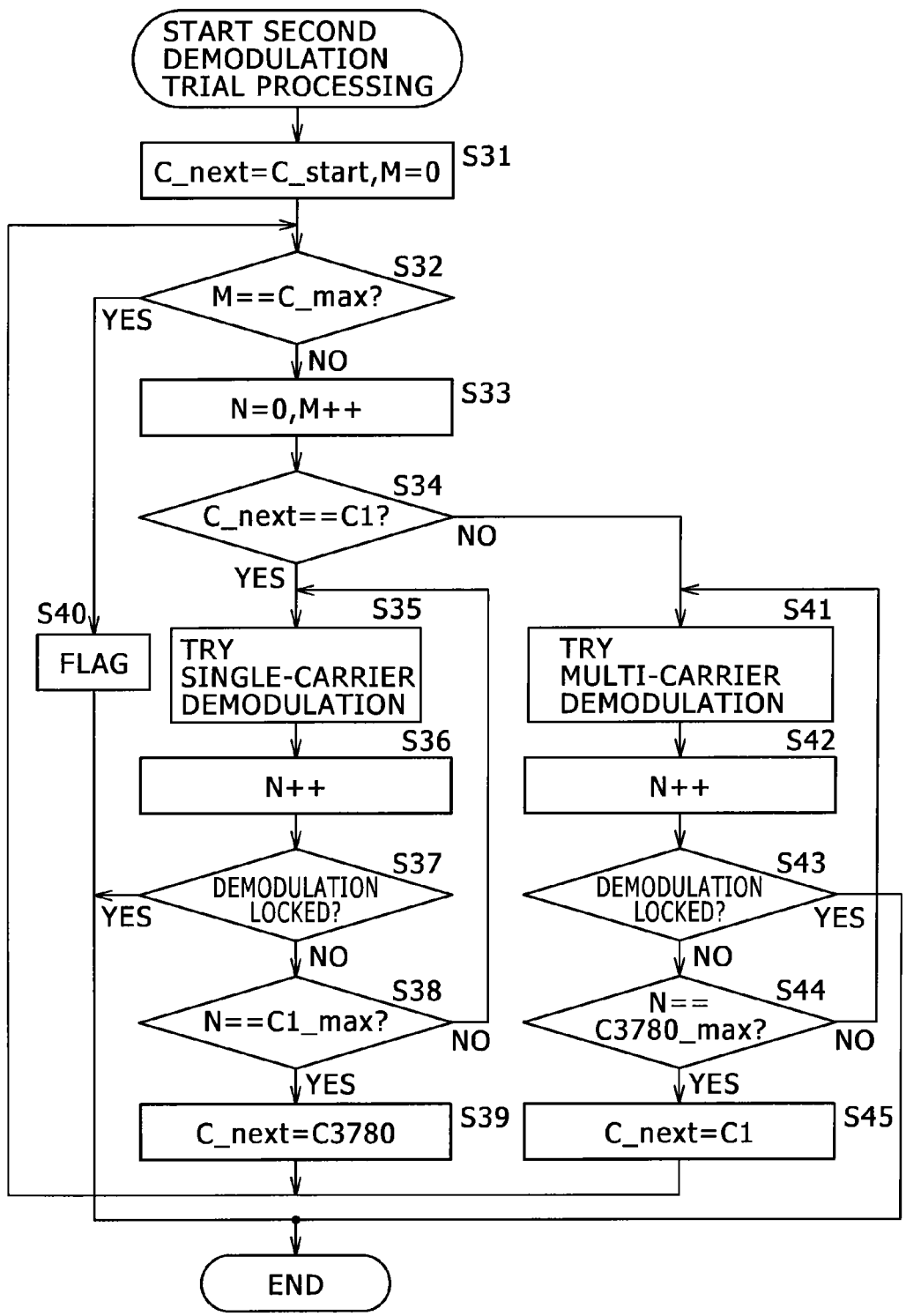
FIG. 4 is a flowchart indicative of a second demodulation trial processing.

Referring to FIG. 4, there is shown a flowchart indicative of the second demodulation trial processing to be executed by the controller 10 and the demodulation block 13.

In the second demodulation trial processing, M (counter) is used as a variable in addition to C_next and N like in the first demodulation trial processing shown in FIG. 3. Further, in the second demodulation trial processing, the processing based on preset parameters is executed like the first demodulation processing shown in FIG. 3, but C_max (the maximum number of trials) is variably set in addition to C_start, C1_max, and C3780_max described above.

When each channel is scanned and the second demodulation trial processing shown in FIG. 4 is executed in the reception apparatus 1, the demodulation control section 31 executes parameter initialization by substituting a preset value of C_start into C_next and then initializes counter M to 0 (step S31). Next, in step S32, the demodulation control section 31 determines whether or not counter M has reached C_max.

If counter M is found not have reached C_max in step S32, then the demodulation control section 31 initializes counter N in step S33 and then increments counter M, upon which the procedure goes to step S34.

In step S34 through step S39, single-carrier demodulation is tried while counter N is incremented like step S13 through step S18 (FIG. 3) described above. To be more specific, processing operations of step S35 through step S38 are repeated until demodulation lock is found turned on ("Yes" in step S37) or counter N is found to have reached C1_max ("Yes" in step S38).

When step S35 through step S38 are repeated, single-carrier demodulation is tried while counter N is incremented. If demodulation lock is found turned on in step S37, it indicates that the demodulation is successful by the single-carrier demodulation executed by the single-carrier demodulation section 42-1. Namely, in this case, because the single-carrier scheme has been detected as the carrier scheme for the transmitted signal, the second demodulation trial processing shown in FIG. 4 is terminated.

On the other hand, if counter N is found to have reached C1_max in step S38, then C3780 is substituted into C_next by the demodulation control section 31 (step S39), upon which the procedure returns to the step S32.

Next, in step S32, the demodulation control section 31 determines again whether or not counter M incremented in accordance with the trial of single-carrier demodulation has reached C_max. If counter M is found to have not reached C_max in step S32, the demodulation control section 31 initializes counter N and increments counter M (step S33).

Next, in step S34, demodulation control section 31 determines whether the value substituted into C_next is C1 or not. Because C3780 is substituted into C_next this time ("No" in step S34), then the procedure goes to step S41.

In step S41 through step S45, multi-carrier demodulation is tried like step S19 through step S23 (FIG. 3) described above. To be more specific, until demodulation lock is found turned on, ("Yes" in step S43) or counter N is found to have reached C3780_max ("Yes" in step S44), the processing operations of step S41 through step S44 are repeated.

When the processing operations of step S41 through step S44 are repeated, multi-carrier demodulation is tried while counter N is incremented. If demodulation lock is found turned on in step S43, it indicates that the demodulation is successful by the multi-carrier demodulation executed by the multi-carrier demodulation section 42-2. Namely, in this case, the multi-carrier scheme has been detected as the carrier scheme for the transmitted signal, the second demodulation trial processing shown in FIG. 4 is terminated.

On the other hand, if counter N is found to have reached C3780_max in step S44, then C1 is substituted into C_next by the demodulation control section 31, upon which the procedure returns to step S32.

Next, the demodulation control section 31 determines again whether or not counter M incremented in accordance with the trial of single-carrier demodulation has reached C_max (step S32). If counter M is found to have not reached C_max, then the procedure goes to step S33. The demodulation control section 31 initializes counter N and increments counter M (step S33).

In step S34, the demodulation control section 31 determines whether or not the value substituted into C_next is C1. Because C1 is substituted into C_next this time ("Yes" in step S34) this time, the procedure goes to step S35 to try single-carrier demodulation. If demodulation lock is not turned on by executing single-carrier demodulation until counter N has reached C1_max, thereby failing demodulation, C3780 is substituted into C_next again to try multi-carrier demodulation.

As described above, the trial of single-carrier demodulation and multi-carrier demodulation alternately and repetitively tries single-carrier demodulation and multi-carrier demodulation by the number of times of trial of each demodulation until demodulation lock is turned on. If demodulation lock is not turned on when counter M has reached C_max ("Yes" in step S32), the procedure goes to step S40.

In step S40, the demodulation control section 31 sets up a flag indicative that there is no flag in the frequency band on which demodulation is currently tried, upon which the second demodulation trial processing shown in FIG. 4 is terminated. To be more specific, in this case, no signal exists in the frequency band on which demodulation is currently tried, so that the second demodulation trial processing on a next frequency band is executed by the demodulation control section 31 and the demodulation block 13.

As described above, in the second embodiment, a signal does not always exist in the frequency band on which demodulation is currently tried, so that, a maximum number of trials C_max is determined in advance. If the number of times single-carrier demodulation and multi-carrier demodulation has exceeded the predetermined maximum number of trials, the trial of demodulation in that frequency band is discontinued, thereby starting the trial of demodulation on a next frequency band. Consequently, the demodulation of a particular frequency band can be terminated within a certain time regardless of demodulation's being successful or not, thereby not only surely detecting a carrier scheme but also quickly detecting a carrier scheme in each frequency band.

3. >The Third Embodiment ≤

It should be noted that the demodulation processing block may also be configured in a manner other than the first configuration shown in FIG. 2. The following describes another configuration with reference to FIG. 5 and FIG. 6.

[Exemplary Configuration (the Second Configuration) of the Demodulation Processing Block]

Figure 5:
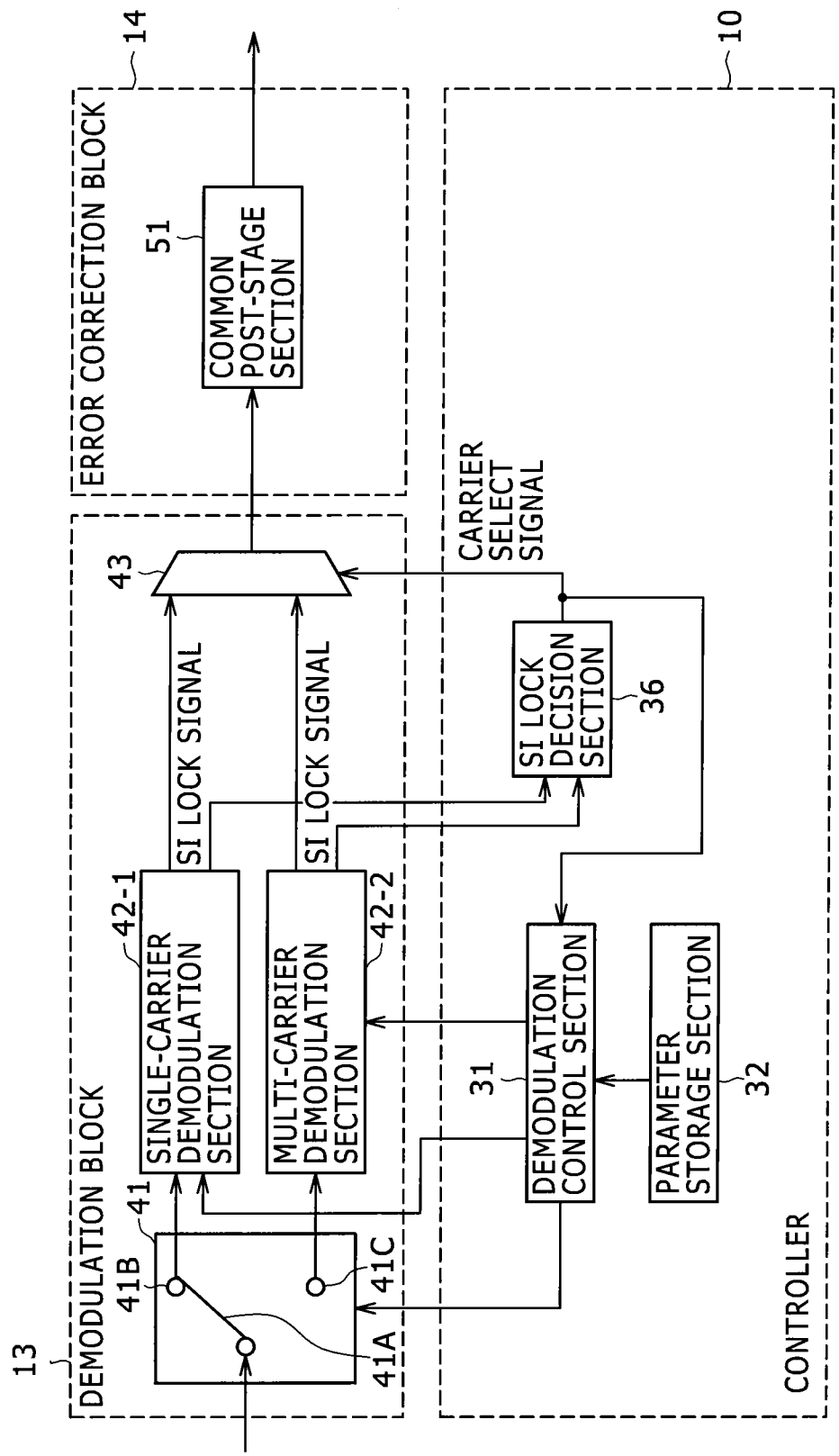
FIG. 5 is a block diagram illustrating an exemplary configuration (or a second configuration) of the demodulation processing block.

Referring to FIG. 5, there is shown the second configuration of the demodulation processing block.

It should be noted that, with reference to the demodulation processing block shown in FIG. 5, component blocks similar to those previously described with reference to the demodulation processing block shown in FIG. 2 are denoted by the same reference numerals and the description thereof will be skipped.

In FIG. 5, as compared with the controller shown in FIG. 2, a controller 10 shown in FIG. 5 has an SI lock decision section 33, a TS lock decision section 34, and an SI lock decision section 36 instead of the selector 35. As compared with the demodulation block 13 shown in FIG. 2, a demodulation block 13 shown in FIG. 5 has a selector 43 in the post stage of a single-carrier demodulation section 42-1 and a multi-carrier demodulation section 42-2.

The single-carrier demodulation section 42-1 executes single-carrier demodulation on an input signal supplied from a switch block 41 under the control of the demodulation control section 31, outputting data obtained as a result of the demodulation to the selector 43.

The multi-carrier demodulation section 42-2 executes multi-carrier demodulation on the input signal supplied from the switch block 41 under the control of the demodulation control section 31 and outputs the data obtained as a result of the demodulation to the selector 43.

If a demodulation trial is successful in the single-carrier demodulation section 42-1 or the multi-carrier demodulation section 42-2, an SI lock signal indicative of a successful demodulation is supplied to the SI lock decision section 36.

The SI lock signal is entered in the SI lock decision section 36 from any one of the single-carrier demodulation section 42-1 and the multi-carrier demodulation section 42-2. If an SI lock signal is entered, the SI lock decision section 36 supplies a carrier select signal for selecting a carrier scheme in accordance with the entered SI lock signal to the demodulation control section 31 and the selector 43.

In accordance with the carrier select signal supplied from the SI lock decision section 36, the selector 43 outputs one of the outputs of the single-carrier demodulation section 42-1 and the multi-carrier demodulation section 42-2, whichever is successful in the trial of demodulation, to an error correction block 14.

The error correction block 14 is made up of a common post-stage section 51. The common post-stage section 51 executes predetermined error correction such as FEC on the data obtained by single-carrier demodulation or multi-carrier demodulation supplied from the selector 43 and outputs the data obtained as a result of the error correction to a decoder 15 in the post stage.

As described above, in the third embodiment, the data of any one of single-carrier demodulation and multi-carrier demodulation, whichever is successful in the trial of demodulation is outputted to the error correction block 14 in the post stage by the selector 43. Therefore, in the error correction block 14, the error correction block 14 need not have the common post-stage section 51-1 and the common post-stage section 51-2 (FIG. 2) for single carrier and multi-carrier, respectively, requiring only one common post-stage section 51. This configuration allows the reduction in the circuit scale of the error correction block 14.

4. >The Fourth Embodiment ≤

[Exemplary Configuration (the Third Configuration) of the Demodulation Processing Block]

Referring to FIG. 6, there is shown an exemplary third configuration of the demodulation processing block.

It should be noted that, with reference to the demodulation processing block shown in FIG. 6, component blocks similar to those previously described with reference to the demodulation processing block shown in FIG. 5 are denoted by the same reference numerals and the description thereof will be skipped.

In FIG. 6, a controller 10 and an error correction block 14 are substantially the same in configuration as the controller 10 and the error correction block 14 shown in FIG. 5. In FIG. 6, a demodulation block 13 has a common demodulation front-end section 44, a single-carrier demodulation back-end section 45-1, and a multi-carrier demodulation back-end section 45-2 instead of the single-carrier demodulation section 42-1 and the multi-carrier demodulation section 42-2 of the demodulation block 13 shown in FIG. 5.

The common demodulation front-end section 44 executes common demodulation processing such as synchronous processing for example, of the above-described demodulation processing operations to be executed in the single-carrier demodulation section 42-1 and the multi-carrier demodulation section 42-2. To be more specific, the common demodulation front-end section 44 executes common demodulation processing in single carrier and multi-carrier on an input signal supplied from a tuner 12 under the control of the demodulation control section 31 and supplies the data obtained as a result of this common demodulation processing to the switch block 41.

The switch block 41 switches the output destination of the data supplied from the common demodulation front-end section 44 under the control of the demodulation control section 31. To be more specific, in trying single-carrier demodulation, the switch block 41 connects a switch 41A to a terminal 41B, thereby outputting the data supplied from the common demodulation front-end section 44 to the single-carrier demodulation back-end section 45-1. In trying multi-carrier demodulation, the switch block 41 connects the switch 41A to the a terminal 41C, thereby outputting the data supplied from the common demodulation front-end section 44 to the multi-carrier demodulation back-end section 45-2.

The single-carrier demodulation back-end section 45-1 executes the demodulation processing unique to the single-carrier demodulation section 42-1 such as equalization for example, of the above-described demodulation processing to be executed by the single-carrier demodulation section 42-1 and the multi-carrier demodulation section 42-2. To be more specific, the single-carrier demodulation back-end section 45-1 executes the demodulation processing unique to single-carrier on the data supplied from the switch block 41 under the control of the demodulation control section 31, thereby outputting the data obtained as a result of this demodulation processing to the selector 43.

The multi-carrier demodulation back-end section 45-2 executes the demodulation processing unique to the multi-carrier demodulation section 42-2 such as equalization for example, of the above-described demodulation processing to be executed by the single-carrier demodulation section 42-1 and the multi-carrier demodulation section 42-2. To be more specific, the multi-carrier demodulation back-end section 45-2 executes the demodulation processing unique to multi-carrier on the data supplied from the switch block 41 under the control of the demodulation control section 31, thereby outputting the data obtained as a result of this demodulation processing to the selector 43.

In accordance with a carrier select signal supplied from the SI lock decision section 36, the selector 43 outputs the output of the single-carrier demodulation back-end section 45-1 or the multi-carrier demodulation back-end section 45-2, whichever is successful in the trial of demodulation, to the error correction block 14 of the post stage.

As described above, in the fourth embodiment, single-carrier demodulation and multi-carrier demodulation are each divided into common demodulation processing, demodulation processing unique to single-carrier, and demodulation processing unique to multi-carrier, thereby integrating the portions in which common demodulation processing is executed. Consequently, the circuit scales of not only the error correction block 14 but also the demodulation block 13 can be reduced.

A related-art method of simultaneously executing both the single-carrier scheme and the multi-carrier scheme can quickly detect one of the carrier schemes at the cost of having duplicate demodulation circuits to increase the circuit scale thereof. In the fourth embodiment of the present disclosure, the parts that can be made common are integrated, thereby allowing the quick detection of the carrier schemes with reduced circuit scale.

5. Variations

With respect to the embodiments described above, the demodulation block 13 and the controller 10 that controls the demodulation block 13 are separately arranged. It is also practicable for the demodulation block 13 to have the demodulation control function of the controller 10. To be more specific, in the above-described embodiments, the demodulation trial processing shown in FIG. 3 and FIG. 4 are executed by the controller 10 and the demodulation block 13; it is also practicable to execute this demodulation trial processing by a demodulation apparatus (or a demodulation LSI (Large Scale Integration)) having the demodulation block 13 and the demodulation control function (the demodulation control section 31 through the selector 35) of the controller 10. Also, this demodulation apparatus may have an A/D conversion block (not shown) in addition to the error correction block 14.

In the above-described embodiments of the present disclosure, the TS lock signals from the common post-stage section 51, the common post-stage section 51-1, and the common post-stage section 51-2 are used to determine whether or not the processing such as error correction for example executed by the common post-stage section 51 for example is successful. It is also practicable to use information associated with BER (Bit Error Ratio) for example instead of the TS lock signals. To be more specific, for example, BER is obtained by dividing the number of decoded (or error-corrected) error codes by the total number of decoded (or error-corrected) codes and it is determined whether or not the obtained BER is below a predetermined threshold value, thereby determining whether or not the processing such as error correction is successful.

In the above-described embodiments of the present disclosure, parameters such as C_start, C1_max, C3780_max, and C_max are set in a variable manner and stored in the parameter storage section 32. It is also practicable to set these parameters according to specific regions by so-called factory setting or manually by the user and store the parameters set in these manners.

[Description of a Computer Applied with the Present Disclosure]

The above-mentioned sequence of processing operations may be executed by software as well as hardware. When the above-mentioned sequence of processing operations is executed by software, the programs constituting the software are installed in a computer which is built in dedicated hardware equipment or installed, from a recording media, into a general-purpose personal computer for example in which various programs may be installed for the execution of various functions.

Referring to FIG. 7, there is shown a block diagram illustrating an exemplary configuration of a computer that executes the above-mentioned sequence of processing by software programs.

In this computer 100, a CPU (Central Processing Unit) 101, a ROM (Read Only Memory) 102, and a RAM (Random Access Memory) 103 are interconnected by a bus 104.

The bus 104 is connected to an input/output interface 105. The input/output interface 105 is connected to an input block 106 made up of a keyboard, a mouse, and a microphone, for example, an output block 107 made up of a monitor display and a loudspeaker, for example, a storage-block 108 made up of a hard disk drive or a nonvolatile memory, for example, a communication block 109 made up of a network interface for example, and a drive 110 for driving a removable media 111, such as a magnetic disk, an optical disk, a magneto-optical disk, or a semiconductor memory.

In the computer 100 configured as described above, the CPU 101 loads programs from the storage block 108 into the RAM 103 via the input/output interface 105 and the bus 104 and executes loaded programs, thereby executing the above-mentioned sequence of processing.

It should be noted that the programs to be executed by the computer may, as a matter of course, be executed in a time-dependent manner in the sequences described herein, but not necessary to be executed in a time-dependent manner. The programs may also be executed in parallel or on an on-demand basis.

While preferred embodiments of the present disclosure have been described using specific terms, such description is for illustrative purpose only, and it is to be understood that changes and variations may be made without departing from the spirit or scope of the following claims.

The present disclosure contains subject matter related to that disclosed in Japanese Priority Patent Application JP 2010-238197 filed in the Japan Patent Office on Oct. 25, 2010, the entire content of which is hereby incorporated by reference.

What is claimed is:

1. A reception apparatus comprising:
   circuitry configured to
      receive a signal modulated by one of a single-carrier scheme and a multi-carrier scheme that are specified by a predetermined standard;
      execute single-carrier demodulation based on the single-carrier scheme onto said signal;

execute multi-carrier demodulation based on the multi-carrier scheme onto said signal; and control such that, in accordance with a preset number of trials in each carrier scheme, one of said single-carrier demodulation and said multi-carrier demodulation is repetitively tried by said preset number of trials for each carrier scheme.

2. The reception apparatus according to claim 1, wherein said circuitry is configured to first try one of said single-carrier demodulation and said multi-carrier demodulation in accordance with a preset carrier scheme for first trying demodulation.

3. The reception apparatus according to claim 2, wherein said circuitry is configured to control such that one of said single-carrier demodulation and said multi-carrier demodulation is tried in accordance with a ratio of a number of trials of each carrier scheme to a preset total number of trials.

4. The reception apparatus according to claim 3, wherein, if said number of trials of said single-carrier demodulation and said multi-carrier demodulation exceeds a preset maximum number of trials, then said circuitry stops the trial of demodulation.

5. The reception apparatus according to claim 1, wherein, if said number of trials of said single-carrier demodulation and said multi-carrier demodulation exceeds a preset predetermined number of times, then said circuitry stops the trial of demodulation.

6. The reception apparatus according to claim 1, wherein, if a trial of any one of said single-carrier demodulation and said multi-carrier demodulation is successful, said circuitry is configure to control such that an output of any one of said single-carrier demodulation section and said multi-carrier demodulation section, whichever is successful in the trial of demodulation, is outputted to a post stage.

7. The reception apparatus according to claim 6, wherein said circuitry is configured to:
execute demodulation processing common to said single-carrier demodulation and said multi-carrier demodulation;
execute demodulation processing unique to said single-carrier demodulation; and
execute demodulation processing unique to said multi-carrier demodulation.

8. A reception method comprising:
receiving a signal modulated by one of a single-carrier scheme and a multi-carrier scheme that are specified by a predetermined standard, by a reception apparatus;
executing single-carrier demodulation based on the single-carrier scheme onto said signal by said reception apparatus;
executing multi-carrier demodulation based on the multi-carrier scheme onto said signal by said reception apparatus; and
controlling such that, in accordance with a preset number of trials in each carrier scheme, one of said single-carrier demodulation and said multi-carrier demodulation is repetitively tried by said preset number of trials for each carrier scheme.

9. A non-transitory computer-readable medium including a program, which when executed by an apparatus, causes the apparatus to:
receive a signal modulated by one of a single-carrier scheme and a multi-carrier scheme that are specified by a predetermined standard;
execute single-carrier demodulation based on the single-carrier scheme onto said signal;

execute multi-carrier demodulation based on the multi-carrier scheme onto said signal; and control such that, in accordance with a preset number of trials in each carrier scheme, one of said single-carrier demodulation and said multi-carrier demodulation is repetitively tried by said preset number of trials for each carrier scheme.

10. A demodulation apparatus comprising:
circuitry configured to
execute, on a reception signal modulated by one of a single-carrier scheme specified by a predetermined standard and a multi-carrier scheme specified by a predetermined standard, single-carrier demodulation based on said single-carrier scheme;
execute multi-carrier demodulation based on said multi-carrier scheme onto said reception signal; and
control such that, in accordance with a preset number of trials in each carrier scheme, any one of said single-carrier demodulation and said multi-carrier demodulation is repetitively tried by said preset number of trials for each carrier scheme.

11. The demodulation apparatus according to claim 10, wherein said circuitry is configured to first try one of said single-carrier demodulation and said multi-carrier demodulation in accordance with a preset carrier scheme for first trying demodulation.

12. The demodulation apparatus according to claim 11, wherein said circuitry is configured to control such that one of said single-carrier demodulation and said multi-carrier demodulation is tried in accordance with a ratio of a number of trials of each carrier scheme to a preset total number of trials.

13. The demodulation apparatus according to claim 12, wherein, if said number of trials of said single-carrier demodulation and said multi-carrier demodulation exceeds a preset maximum number of trials, then said circuitry stops the trial of demodulation.

14. The demodulation apparatus according to claim 10, wherein, if said number of trials of said single-carrier demodulation and said multi-carrier demodulation exceeds a preset predetermined number of times, then said circuitry stops the trial of demodulation.

15. The demodulation apparatus according to claim 10, wherein, if a trial of any one of said single-carrier demodulation and said multi-carrier demodulation is successful, said circuitry is configured to control such that an output of any one of said single-carrier demodulation section and said multi-carrier demodulation section, whichever is successful in the trial of demodulation, is outputted to a post stage.

16. The demodulation apparatus according to claim 15, wherein said circuitry is configured to:
execute demodulation processing common to said single-carrier demodulation section and said multi-carrier demodulation section;
execute demodulation processing unique to said single-carrier demodulation section; and
execute demodulation processing unique to said multi-carrier demodulation section.

17. A demodulation method comprising:
executing, on a reception signal modulated by one of a single-carrier scheme specified by a predetermined standard and a multi-carrier scheme specified by a predetermined standard, single-carrier demodulation based on said single-carrier scheme by a demodulation apparatus;
executing multi-carrier demodulation based on said multi-carrier scheme onto said reception signal by said demodulation apparatus; and controlling such that, in accordance with a preset number of trials in each carrier scheme, any one of said single-carrier demodulation and said multi-carrier demodulation is repetitively tried by said preset number of trials for each carrier scheme.

18. A non-transitory computer-readable medium including a program, which when executed by an apparatus, causes the apparatus to:

execute, on a reception signal modulated by one of a single-carrier scheme specified by a predetermined standard and a multi-carrier scheme specified by a predetermined standard, single-carrier demodulation based on said single-carrier scheme;

execute multi-carrier demodulation based on said multi-carrier scheme onto said reception signal; and control such that any one of said single-carrier demodulation and said multi-carrier demodulation is tried on said reception signal in accordance with a preset predetermined rule;

control such that, in accordance with a preset number of trials in each carrier scheme, one of said single-carrier demodulation and said multi-carrier demodulation is repetitively tried by said preset number of trials for each carrier scheme.

* * * * *